United States Patent

[11] 3,602,828

[72] Inventors Fred Kurzweil, Jr.
Saratoga;
Marco Padalino, San Jose, both of, Calif.

[21] Appl. No. 869,574
[22] Filed Oct. 27, 1969
[45] Patented Aug. 31, 1971
[73] Assignee International Business Machines Corp.
Armonk, N.Y.

[54] SELF-CLOCKING DETECTION SYSTEM
7 Claims, 11 Drawing Figs.

[52] U.S. Cl. .......... 329/104, 307/232, 328/63, 328/109, 329/107, 340/146.1
[51] Int. Cl. .......... H03k 9/06
[50] Field of Search .......... 329/104, 107; 328/63, 109, 110, 72; 307/232, 269; 340/146.1

[56] References Cited

UNITED STATES PATENTS

| | | | |
|---|---|---|---|
| 3,390,284 | 6/1968 | Carothers et al. | 307/269 |
| 3,401,346 | 10/1968 | Brown et al. | 307/269 X |
| 3,405,391 | 10/1968 | Halfhill et al. | 328/109 X |
| 3,428,904 | 2/1969 | Aziz | 307/232 |
| 3,518,554 | 6/1970 | Gabor | 328/63 |

*Primary Examiner*—Alfred L. Brody
*Attorneys*—Hanifin and Jancin and Nathan N. Kallman

ABSTRACT: The invention relates to both a method and an apparatus for separating data and clock signals from a self-clocking encoded input signal by means of a self-clocking detector system which employs clock circuitry operating at the same frequency as the data rate embodied in the self-clocking encoded input signal.

INVENTORS
FRED KURZWEIL, JR
MARCO PADALINO

BY Edward M Suden

AGENT

SELF-CLOCKING DETECTION SYSTEM

BACKGROUND OF THE INVENTION

1. Field of the Invention

This invention relates to self-clocking detection systems. More specifically, the invention relates to modified frequency modulation MFM self-clocking detection systems.

2. Prior Art

Detection systems for self-clocking codes such as modified frequency modulation MFM, pulse modulation PM, and frequency modulation FM, are well known in the prior art. One basic limitation in extending the use of self-clocking codes into the field of high-frequency recording has been the requirement that the clocking circuitry of the self-clocking detector must operate at twice the bit rate.

In the past, the self-clocking detection systems have usually employed variable frequency oscillators, that operated at twice the data frequency. In general, in the prior art, the input signal (comprising both data and clock information) was used to control the frequency of a variable frequency oscillator, normally a ramp generator, within the clocking circuit of the self-clocking detection system. As frequency increases, it becomes more difficult to generate a ramp to give precision timing information. The ramp signal was used to generate data windows which in turn were used to separate the data from the clock signals of the input signal.

Therefore, an object of the present invention is to provide a new self-clocking detection system which employs clock circuitry operating at the same frequency as the data rate.

Another object of the present invention is to provide a new method of separating data and clock signals from a self-clocking encoded signal by employing clocking circuitry having the same frequency as the data rate.

SUMMARY OF THE INVENTION

The invention relates to both a method and an apparatus for separating data and clock signals from an input signal by means of a self-clocking detector system which employs clock circuitry operating at the same frequency as the data rate.

The method comprises the steps of generating a ramp signal at a frequency equal to the data rate, generating both a data window and a clock window from the ramp signal, separating the data from the clock signal of the input signal by means of the data and clock windows, delaying the separated clock signals one-half of a bit cell time, where the bit cell time is defined as the period of the ramp frequency, recombing the separated data signals with the delayed clock signals, generating an average error correction signal as a function of the displacement from the center of the ramp of the occurrence of either a data signal or a delayed clock signal, controlling the frequency of the ramp generator by the generated average error correction signal.

The apparatus basically comprises a data and clock window generator which includes clocking circuitry having an oscillator operating at the frequency equal to the data rate. The oscillator is usually in the form of a ramp generator and is free running once it is turned on. Start logic recognizes from the input signal when data is being sent. Any means of message framing or synchronization which is well known in the art today may be employed to indicate a start of data to the detection systems, which in turn turns on the free running ramp generator. The free running ramp generator generates a data window and a clock window which are fed into a detector which has as its main input the input signal. The detector separates the data from the clock signals of the input signal and outputs the data on a separate data line and the clock signals on a separate clock line. The data output line and the clock output line of the detector are fed into a ramp error detector which delays the clock signals one-half the period of the ramp generator and then combines the signals on the data output line with the delay signals on the clock output line of the detector. The new combined signals are compared with the ramp signal from the ramp generator to create an average error correction signal which is indicative of the displacement of either a data signal or a clock signal from the center of the ramp. The error signal is connected to the ramp generator for controlling the frequency of the ramp generator such that the data signals and clock signals will appear in the center of the ramp.

The advantage of this method and apparatus is obvious. The maximum data rate can now be at least doubled since there is no longer a requirement that the clock circuitry operate at twice the data rate. With this requirement removed from the clock circuitry of the self-clocking detection system, self-clocking codes become competitive with other coding schemes now presently in use in the field of high data rates.

BRIEF DESCRIPTION OF THE DRAWINGS

The foregoing and other objects, features and advantages of the invention will be apparent from the foregoing and more particular description of the preferred embodiment of the invention as illustrated in the accompanying drawings.

In the Drawings

DETAILED DESCRIPTION OF THE PREFERRED EMBODIMENT

All of the individual circuit elements such as AND circuits, OR circuits, sample and hold circuits, ramp generators, comparators, etc., can be found in the reference test "PULSE & DIGITAL CIRCUITS," Millman and Taub, McGraw-Hill, 1956.

Figure 1:
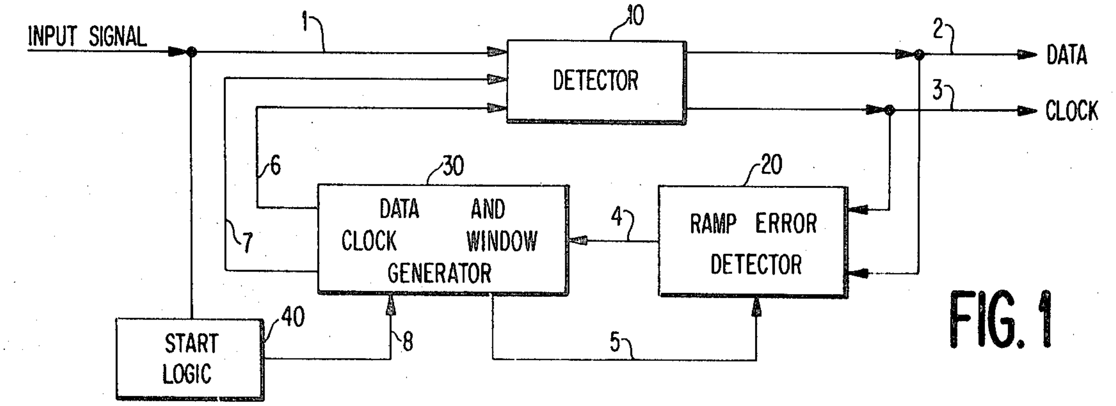
FIG. 1 shows preferred embodiment of the self-clocking detection system.

FIG. 1 shows the preferred embodiment of applicant's self-clock detection system. The input signal is inputted on line 1, and connected to the input of detector 10 and start logic 40. Start logic 40 recognizes the start of a message by any of the well-known message framing techniques now known in the prior art. The circuitry of the start logic to recognize the start of a message is not part of the invention but is shown here only to aid in the understanding of how the self-clocking detection system interacts with an overall communication system employing self-clocking codes. The start logic sensing the start of a message turns on a free running oscillator in the data and clock window generator 30. The data and clock generator 30 generates a data window pulse on line 7 and a clock window pulse on line 6 Lines 6 and 7 are inputted into detector 10. Detector 10 separates the data signals of the input signal from the clock signals of the input signals and outputs the data signals on line 2 and the clock signals on line 3. Lines 2 and 3 are connected to ramp error detector 20. Ramp error detector 20 delays the clock signals on line 3 one-half the period of the frequency of the free running oscillator found in the data and clock window generator 30. The free running oscillator in the data and clock window generator 30 is a ramp generator. The output of the ramp generator of the data and clock window generator 30 is outputted on line 5, which is connected into the ramp and error detection 20. Error circuitry within ramp error detector 20 generates an error signal as a function of the displacement of either data signals or delayed clock signals from the center of the ramp signals and outputs the error signal on line 4. Line 4 is connected to the data and clock window generator 30 and controls the frequency of the free running oscillator, that is, the free running ramp generator included within the data and clock window generator 30.

Figure 2:
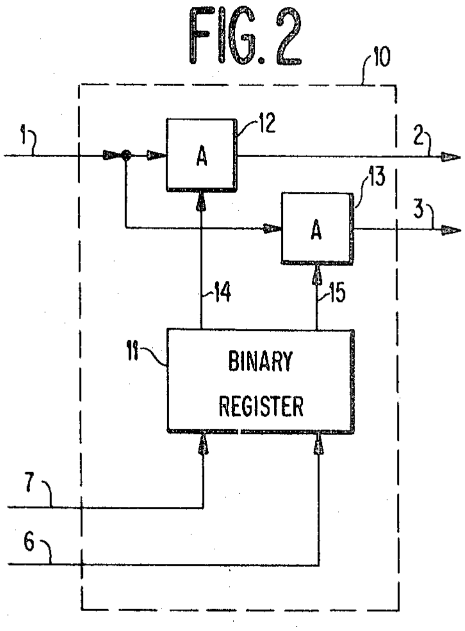
FIG. 2 is a logic diagram of the detector of FIG. 1.

FIG. 2 is a logic diagram of detector 10. Detector 10 is shown to consist of a binary register 11 and AND circuits 12 and 13. Binary register 11 generates a data window on line 14 and a clock window on line 15 from the data window signals which are inputted on line 7 and the clock window signals which are inputted on line 6. AND circuit 12 will output data on line 2 whenever a signals appears on input line 1 in coincidence with a data window on line 14. In a similar manner, AND circuit 13 will output clock signals whenever a signal appears on line 1 in coincidence with the occurrence of a clock window on line 15.

Figure 3:
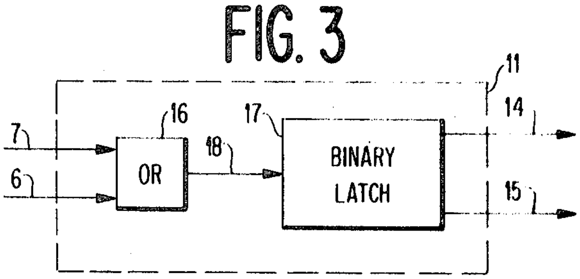
FIG. 3 is a logic diagram of the binary register of FIG. 2.

FIG. 3 shows one type of binary register 11 for generating clock windows on line 15 and data windows on line 14. The binary register 11 may simply be composed of OR circuit 16 and a binary latch 17. The clock window pulses on line 6 and the data window pulses on line 7 are OR-ed together by means of OR circuit 16 and outputted as a single stream of signals to binary latch 17. Binary latch 17 is complimented each time a signal appears on line 18. The two output lines 14 and 15 of the binary latch 17 have compliment output signals. This means that when line 15 is positive, line 14 is negative; and when line 15 is negative line 14 is positive.

Figure 4:
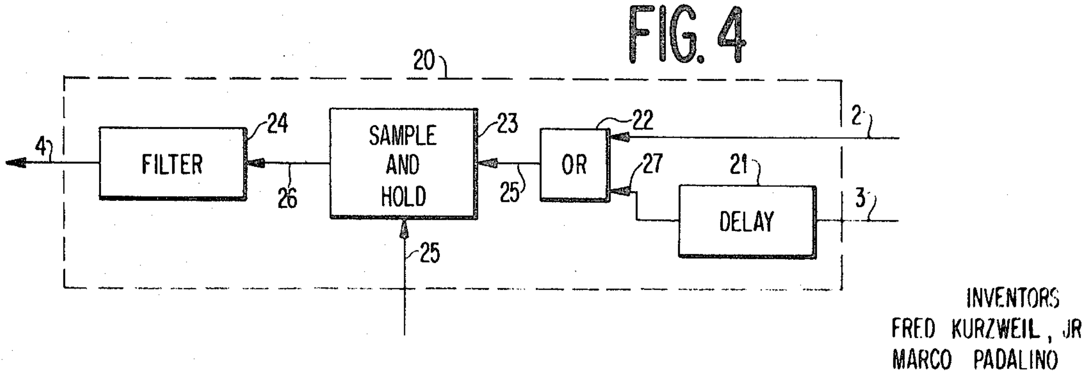
FIG. 4 is a logic diagram of the ramp error detector of FIG. 1.

FIG. 4 shows a logic diagram of the ramp error detector 20. Output line 3 of detector 10 having clock signals thereon is connected to delay 21. Delay 21 delays the clock signals on line 3 for a time equal to one-half the period of the frequency of the free running ramp generator which exists in the clocking circuitry found in the data and clock window generator 30. OR circuit 22 combines the data signals on line 2 and the delayed clock signals on line 27 and outputs the combined signals on line 25. The output of the ramp generator found within the data and clock window generator 30 is inputted on line 5 into a sample-and-hold circuit 23. The output of the OR circuit 22 is also inputted into the sample-and-hold circuit 23 via line 25. The sample-and-hold circuit 23 will sample the ramp signal appearing on line 5 whenever a signal is inputted on line 23 and hold that value until another sampling takes place. The output of the sample-and-hold circuit 23 is an error voltage which is indicative of the displacement of the signals appearing on line 25 from the center of the ramp which appears on line 5. The output of the sample-and-hold circuit is passed through a filter 24 for averaging over five ramp periods the output of the sample and hold circuit 23. The output of the filter 24 is an average error correction signal which appears on line 4. Filter 24 effectively dampens the response of the detection system to short and rapid changes in frequency of the input signal.

Figure 5:
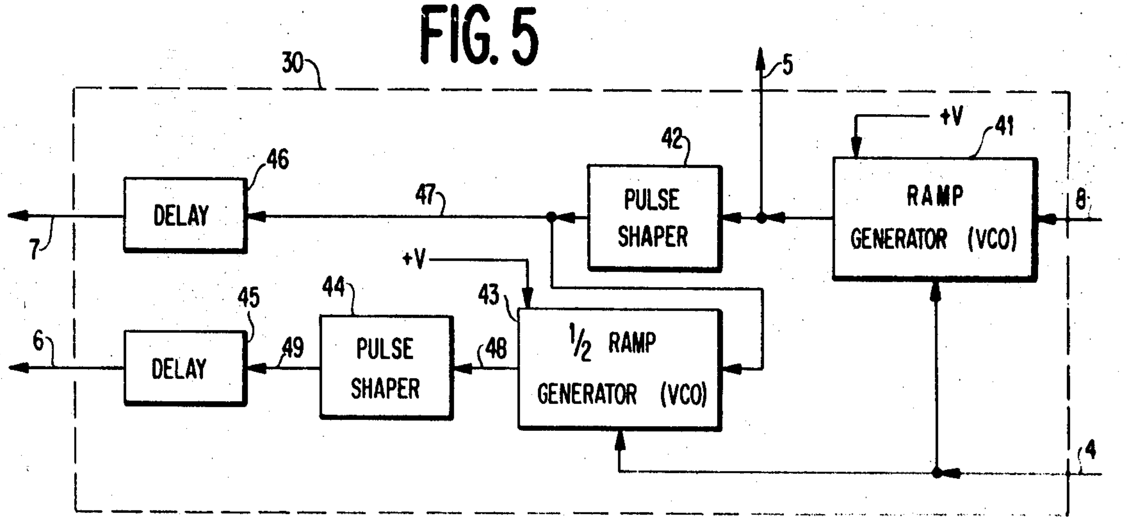
FIG. 5 is a first type of data and clock window generator of FIG. 1.
Figures 8, 9, 10, 11:
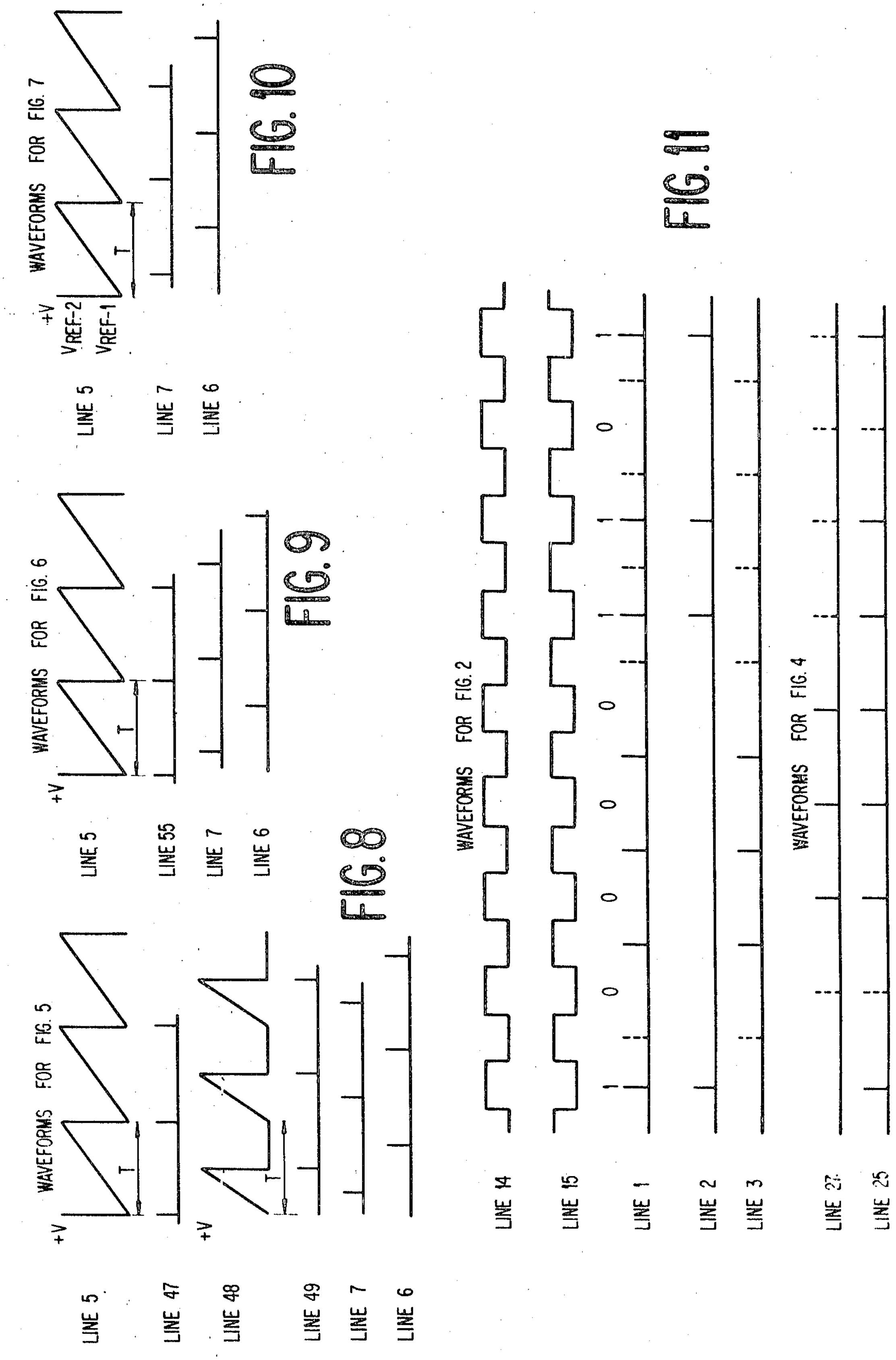
FIG. 8 shows the waveforms associated with the data and clock window generator.
FIG. 9 shows the waveforms associated with the second type of data and clock window generator.
FIG. 10 shows the waveforms associated with the third type of data and window generator.
FIG. 11 shows the waveforms associated with the self-clocking detection system when the input signal is encoded by the self-clocking code of modified frequency modulation (MFM).

FIG. 5 is a first type of data and clock window generator 30. A start signal from start logic 40 is inputted to ramp generator 41 via line 8. Ramp generator 41 is a free running voltage controlled oscillator which outputs a ramp waveform whose peak value is equal to +V. The period of the sawtooth waveform is times T. Ramp generator 41 frequency output is controlled by the average error correction signal which appears on line 4. The sawtooth waveform is outputted on line 5 from ramp generator 41 and fed into pulse shaper 42. Pulse shaper 42 generates a single pulse from the sawtooth waveform in each period T. The frequency of the pulses out of the pulse shaper 42 is, therefore, the same frequency as the frequency of the sawtooth waveform. Pulse shaper 42 may consist of a threshold detector which fires a pulse generator whenever a selective voltage of the ramp function is sensed. The output of pulse shaper 42 is connected to one-half ramp generator 43 and to delay 46 via line 47. The one-half ramp generator 43 is synchronized to the pulses received from pulse shaper 42 and generates a sawtooth waveform as depicted in FIG. 8, line 48. The one-half ramp generator is a voltage controlled oscillator whose frequency is controlled by the average error correction signal which appears on line 4. The amplitude of the sawtooth waveform which is outputted from the one-half ramp generator 43 is dictated by the reference voltage +V.

The output of the one-half ramp generator 43 is connected to pulse shaper 44 via line 48. Pulse shaper 44 generates a pulse during each period T of the output waveform of the one-half ramp generator 43. The frequency of the pulses outputted from pulse shaper 42 is the same as the frequency of the sawtooth waveform outputted from the one-half ramp generator 43. The output of the pulse shaper 44 is fed into delay 45 via line 49. Delay 46 compensates for the internal delays within the electronic components of the detector system and is selected so as to have the data window pulses appearing on line 7 in the desired time relationship with data pulses appearing in the input signal. Delay 45 again compensates for internal delays of the electronic circuitry and is used to determine the ratio of the data window to the clock window. The delay of delay 45 is always greater than the delay of delay 46. The clock window pulses are outputted from delay 45 on line 6 and determined what portion of period T will be allotted for the clock window.

Figure 6:
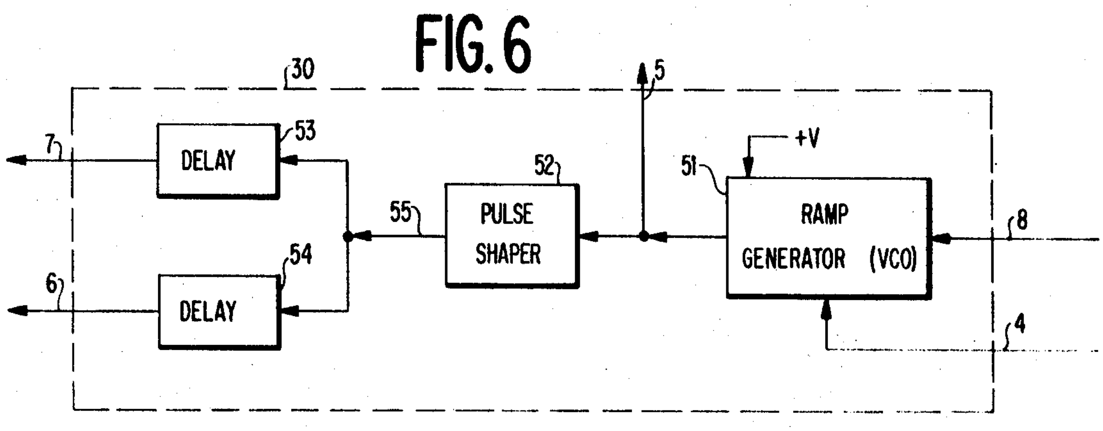
FIG. 6 is a second type of data and clock window generator of FIG. 1.

FIG. 6 shows a second type of data and clock window generator 30. The second type of data window generator 30 is basically comprised of a ramp generator 51 and pulse shaper 52 which are the same and operate in the same manner as ramp generator 41 and pulse shaper 42 of the first type of data and clock window generator 30 heretofore described. The output of pulse shaper 52 is connected to delay 53 and delay 54 via line 55. Delay 53 and delay 54 operate and serve the same purposes respectively as did delay 46 and 45 of the first type of data and clock window generator 30 heretofore described.

Figure 7:
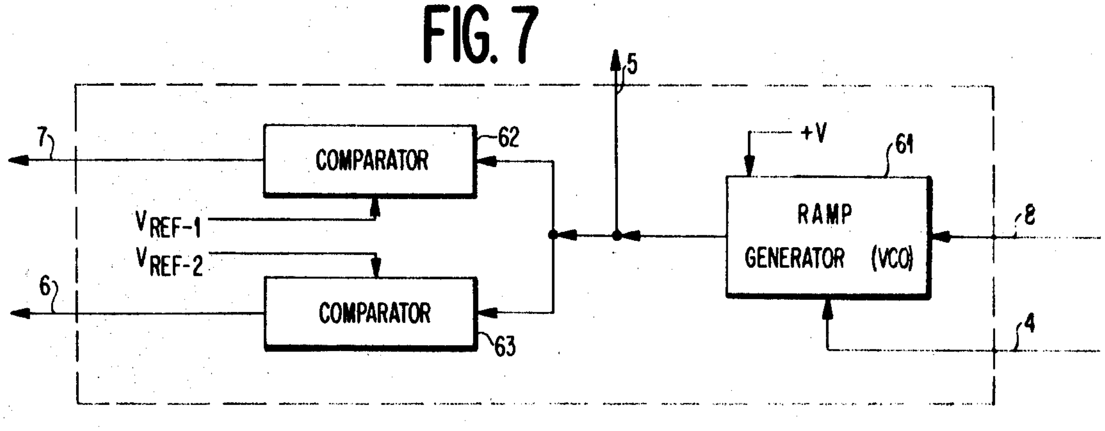
FIG. 7 is a third type of data and clock window generator of FIG. 1.

FIG. 7 shows a third type of data and clock window generator 30. The third type of data and clock window generator 30 comprises ramp generator 51 which is a voltage controlled oscillator whose frequency is controlled by the average error correction signal which appears on line 4 and whose amplitude is dictated by the reference voltage +V. Ramp generator 61 is turned on by a start signal which appears on line 8 from start logic 40. The output of ramp generator 61 is connected to comparators 62 and 63. Comparator 62 has a reference voltage of $V_{ref1}$ which is compared against the instantaneous values of the ramp signal outputted from the ramp generator 61. When the ramp function reaches the reference voltage $V_{ref1}$ the comparator senses that state and generates a pulse which is outputted on line 7 as a data window pulse. In similar manner, comparator 63 has an input reference voltage of $V_{ref2}$ which is compared against the instantaneous values of the ramp signal inputted into comparator 63. When the ramp signals exceeds the reference voltage $V_{ref2}$ an output pulse is generated and outputted on line 6 as a clock window pulse. Here again, the voltage reference $V_{ref1}$ and $V_{ref2}$ are picked so as to compensate for internal delays within the self-cocking detection system and fixes the ratio of the data window to the clock window during the period T of the ramp signal which is outputted from ramp generator 61.

OPERATION OF THE PREFERRED EMBODIMENT

The method of self-clocking detection using clock circuitry having the same frequency as the data rate will be incorporated into the discussion of the operation of the self-clocking detection system for ease of understanding.

The first step of the method is to generate a ramp signal which has a frequency equal to the data rate of the data incorporated in the input signal. Further, it is usually desirous to have the data signal incorporated in the input signal to have a time relationship with the ramp signal such that a data signal will occur when the ramp signal has reached its center value. This is usually a design criteria and has been followed in the design of the self-clocking detection system herein described.

The second step of the method is to generate data window pulses and clock window pulses from the generated ramp function. This is accomplished by the three types of data and clock window generator 30, previously described.

FIG. 8 shows the waveforms associated with the operation of the first type of data and clock window generator as shown in FIG. 5. Assuming that a start signal has been received by ramp generator 41, the ramp generator will generate a ramp signal on line 5 as shown in FIG. 8. Let it further be assumed that no error correction voltage is being received on line 4 so that the frequency of the ramp generator represents the normal rate at which data is to be received. Whenever the ramp signal reaches a value of +V a pulse is generated and shaped by pulse shaper 42 and outputted on line 47. The pulses out of pulse shaper 42 activate the one-half ramp generator 43 which outputs a ramp waveform which appears on line 48. Once again, pulses are generated whenever the ramp signal reaches a value of +V and shaped by pulse shaper 44 and outputted on line 49. Delay 46 delays the pulses on line 47 so as to compensate for fixed delays in the system and to position the pulses on line 7 so as to correspond to the desired time at which a data window is desired to be started. In similar fashion, delay 45 delays the pulses on line 49 to compensate for internal delays of the detection system and to provide the desired ratio between the data window and the clock window. The pulses as shown in FIG. 8, lines 6 and 7 are such as to create a ratio of 1-to-1 for the data window and clock window. It should be realized, however, that normally it is desirous to have the data window of a longer duration than the clock window since it is of greater importance to increase the probability of receiving the data than for receiving clock. It should be realized that any ratio may be obtained by the selections of the time for the delays 46 and 45 respectively.

When the data rate changes an average error correction voltage will appear on line 4 and change the frequency of ramp generator 41 and the one-half ramp 43.

It is further desirous at the nominal data rate to have the clock window and data window so designed that the data and clock pulses will occur in the middle of the data and clock windows respectively. As the input signal rate increases, which means the data and clock rates increase, the data and clock windows will change in ratio and will shift off center from the desired relationship with the data and clock pulses in the input signal. The change in ratio between the clock window and the data window is caused by the fixed delays 21, 46 and 45.

FIG. 9 shows the waveforms for the second type of data and clock window generator 30 as shown in FIG. 6. Ramp generator 51 is a voltage controlled oscillator generating a ramp signal as shown on line 5 of FIG. 9 whenever a start signal has been received on line 8 from the start logic 40. Here again, whenever the ramp signal reaches the reference voltage +V a pulse is generated and shaped by pulse shaper 52 and outputted on line 55. Delay 53 delays the pulses on line 55 so as to generate data window pulses on line 7. In similar manner, delay 54 delays the pulses on line 55 to generate clock window pulses on line 6. It is clear that by the choice of delays 53 and 54 any data to clock window ratio may be obtained.

When the input signal frequency increases or decreases, the data to clock ratio and the position of the data and clock windows with respect to data and clock pulses again shift due to the fixed delay values of delays 21, 53 and 54. The most noticable shifting effect is experienced on line 6, since by design, it is delayed a fixed amount more than the pulse on line 7 regardless of the input data frequency. The data window remains a constant value and only the value of the clock window changes. Therefore, the ratio between the data window and clock window per unit shift in frequency of the input signal is amplified.

FIG. 10 shows the third type of data and clock window generator 30 as shown in FIG. 7. Ramp generator 61 becomes free running once it receives a start signal on line 8 from start logic 40 and outputs a ramp signal on line 5. Comparator 62 generates a data window pulse on line 7 whenever the ramp voltage reaches the threshold reference value of $V_{ref l1}$. Similar fashion, comparator 63 generates a clock window pulse whenever the ramp voltage passes the threshold of $V_{ref l2}$. As the frequency of the input signal increases and decreases an average error correction signal is inputted to a ramp generator 61 via line 4 and frequency of the ramp signal will increase and decrease accordingly. However, unlike the first and second type of data and clock window generator 30, for a given environment the data-to-clock window ratio will remain substantially constant and will have nominal shift from the desired center relationship with the data and clock pulses. This is due to having only one fixed delay 21 in the detector system.

Therefore, it can be realized that within a given environment, the second type of data and clock window generator 30 may be used where only slight shifts in frequency of the input signal is expected and where a low cost data and clock window generator is desired. The first type of data and window generator 30 may be used with variations in speed greater than that allowed for the second type of data and clock window generator 30 but with a moderate increase in cost. The third type of data and clock window generator 30 may be used where large shifts in frequency of the input signal is to be expected and optimum operation is desired.

It should be noted that all three types of data and clock window generators produce for a given ramp signal, the same data window and clock window pulses as is evident by viewing lines 6 and 7 of FIGS. 8, 9 and 10.

The third step of the method is to generate data and clock windows from the data window and clock window pulses. With reference to FIGS. 11, 2 and 3, it can be seen that the data window pulses and clock window pulses operate a binary register 11 to form a data window on line 14 and a clock window on line 15. Further, it is clear that the data and clock windows are compliments of each other. At this time, it is necessary for the discussion to assume a specific type of input signal. The input signal selected was encoded by the self-clocking code called modified frequency modulation MFM. MFM comprises the use of two clock phases called respectively clock bits and data bits. If the data bit is a 1, the clock bit is blocked on both sides of the data bit. If the data bit is a 0, the clock bit is recorded. The data cell is defined as the time between adjacent clock pulses which is equal to the period T of the ramp signal outputted by the ramp generator in the data and clock window generator 30. If the data bit is a 1, a bit is recorded at the center of the bit cell; if the data bit is a 0, no bit is recorded. With reference to FIG. 11, line 1, there is shown an input signal encoded by MFM. The dotted pulses indicate wherein clock pulses have been inhibited.

The fourth step of the method is to separate the data and clock pulses appearing on an input line by use of a generated data window and clock window. Returning to FIG. 4 and FIG. 11, it can be seen that data pulses of the input signal on line 1 will pass through AND gate 12 and be outputted on data output line 2. In similar fashion clock pulses of the input signal on line 1 will be gated through AND circuit 13 onto clock output line 3.

The final step of the method is to generate an average error correction signal which will cause the ramp generator within the data and clock window generator 30 to operate at the same frequency as the data rate in the input signal. With reference to FIG. 4 and FIG. 11, the clock pulses appearing on line 3 are delayed by delay 21. Delay 21 is designed to equal one-half the period of a single cycle of the ramp frequency from the ramp generator in the data and clock window generator 30 which would occur under nominal conditions, that is, at the input data rate which the system is designed to receive and which causes no average error correction signal to be outputted on line 4 from the ramp error detector 20. The data signals on the data line 2 are combined with the delayed clock signals by means of OR circuit 22 and appear on line 25. The pulses on line 25 initiate sampling of the ramp function by means of the sample-and-hold circuit 23. The sample-and-hold circuit 23 generates an error voltage that is indicative of the displacement of the pulses on line 25 from the center of the ramp signals on line 5. Filter 24 is an averaging filter which smooths the error signal to the data and clock window generator 30. In this embodiment, the filter has been designed so as to average the output of the sample-and-hold circuit 23 over a period of time consisting of five ramp periods. It should be noted that the delayed clock pulses can cause errors to be introduced into the error correction voltage from the sample-and-hold circuit 23. The data pulses appearing on line 2 provide a correct error correction signal from the sample-and-hold circuit 23. Therefore, by averaging the error correction voltage over a period of time any error introduced by the delayed clock pulses when the input signal is not at a nominal frequency will be diminished.

In summary, the method heretofore disclosed allows the detection of self-clocking codes by means of clock circuitry operating at the same frequency as the data rate embodied within the input signal encoded by the self-clocking code. The advantage is obvious in that self-clocking codes can be used in high data rate encoding systems.

What is claimed is:

1. A binary data detection system comprising:

an input signal having a rate of 2*f*, said input signal consisting of data pulses and clock pulses, said data pulses having a rate of *f*;

a first means for generating a first and second signal each at a frequency of *f*, said first means comprising a ramp generator operating at a frequency of *f*;

a second means receiving said input signal and said first and second signals from said first means for separating said data pulses from said clock pulses of said input signal, said second means having a first output for data and a second output for clock;

a third means for receiving the output of said ramp generator of said first means and said first and second output of said second means for generating an average error correction signal proportional to displacement of said data and clock pulses of said input signal from the center of the ramp output of said ramp generator; and said ramp generator of said first means receiving said average error correction signal from said third means causing the center of said ramp output of said ramp generator to correspond to the occurrence of said data pulses of said input signal.

2. A binary data detection system as set forth in claim 1 wherein said second means comprises:

a binary register for receiving said first and second signals from said first means and for generating a data window and a clock window;

a first AND circuit for receiving said data window and said input signal, the output of said first AND circuit being said first output of said second means; and a second AND circuit for receiving said clock window and said input signal, the output of said second AND circuit being the second output of said second means.

3. A binary data detection system as set forth in claim 2 wherein said third means comprises:

a delay for receiving the second output of said second means and for adjusting said second output of said second means to be in phase with said first output of said second means;

an OR circuit for combining the first output of said second means with the output of said delay to create a third signal; and an error-generating means for comparing the occurrence of pulses in said third signal with the center of said ramp output of said ramp generator of said first means and for generating an average error correction signal from said comparison.

4. A binary data detection system as set forth in claim 3 wherein said first means comprises:

a ramp generator operating at a frequency *f* and being responsive to said average error correction signal from said third means;

a first pulse shaper for receiving the output of said ramp generator and for converging said ramp output of said ramp generator into a pulse train having a frequency of *f*;

a one-half ramp generator synchronized to the output of said first pulse shaper and responsive to said average error correction signal of said third means;

a second pulse shaper for receiving the ramp output of said one-half ramp generator and for converting said ramp output of said one-half ramp generator into a pulse train having a frequency of *f*;

a first delay for receiving the output of said first pulse shaper and for adjusting the pulses of said pulse train from said first pulse shaper to correspond to the start of said data window of said second means; and a second delay for receiving output of said second pulse shaper and for adjusting the pulses of said pulse train from said second pulse shaper to correspond with the start of said clock window of said second means.

5. A binary data detection system as set forth in claim 3 wherein said first means comprises:

a ramp generator operating at a frequency of *f* and said ramp generator being responsive to said average error correction signal from said third means;

a pulse shaper for receiving the output of said ramp generator and for converting said output of said ramp generator into a pulse train having a frequency of *f*;

a first delay for receiving the output of said pulse shaper and for adjusting the pulses of said pulse train from said pulse shaper to correspond with the start of said data window of said second means; and a second delay for receiving the output of said pulse shaper and for adjusting the pulses of said pulse train from said pulse shaper to correspond to the start of said clock window of said second means.

6. A binary data detection system as set forth in claim 3 wherein said first means comprises:

a ramp generator operating at a frequency of *f* and responsive to said average error correction signal from said third means;

a first comparator for producing an output pulse whenever said output ramp of said ramp generator reaches a first reference level, the output of said comparator being said first signal of said first means and said first reference level on said ramp of said ramp generator corresponding in time to the start of said data window of said second means; and a second comparator for receiving the output from said ramp generator for generating an output pulse whenever the ramp of said ramp generator reaches a second reference level, the output of said second comparator being the second signal of said first means, said second reference level on said ramp of said ramp generator corresponding in time to the start of said clock window of said second means.

7. A method for detecting data signals from an input signal encoded by a self-clocking code comprising the steps of:

generating a ramp signal having the same frequency as the data rate of said data signals in said input signal;

generating a first and second signal from said ramp signal, said first and said second signals both having the same frequency as said ramp signals;

generating a data window signal and a clock window signal from said first and second signals;

separating said data signal from said clock signals of said input signal by means of said data window signal and said clock window signal, placing said data signals on a first output line and said clock signals on a second output line;

adjusting said clock signals on said second output line to be in phase with said data signals on said first output line;
combining said adjusted clock signals with said data signals to form a controlled signal;
generating an average error correction signal by comparing the phase relationship of said control signal with said ramp signal;
controlling the frequency of said ramp signal as a function of said average error correction signal.